United States Patent [19]

Bracke et al.

[11] 4,283,506

[45] Aug. 11, 1981

[54] PROCESS FOR PREPARING RUBBER REINFORCED STYRENIC RESINS

[75] Inventors: William J. I. Bracke, Hamme; Emmanuel Lanza, Brussels, both of Belgium

[73] Assignee: Labofina, S.A., Brussels, Belgium

[21] Appl. No.: 134,473

[22] Filed: Mar. 27, 1980

[51] Int. Cl.³ .............................................. C08L 27/00
[52] U.S. Cl. .................................. 525/309; 525/260; 525/263; 525/292; 525/313
[58] Field of Search ............... 525/260, 263, 292, 309, 525/313, 243, 902

[56] References Cited

U.S. PATENT DOCUMENTS

| | | | |
|---|---|---|---|
| 3,448,175 | 6/1969 | Doak et al. | 525/243 |
| 3,793,402 | 2/1974 | Owens | 525/902 |

*Primary Examiner*—J. Ziegler

[57] ABSTRACT

A continuous process for polymerizing a monomer mixture of acrylate and diolefinic compound in the presence of a copolymeric matrix of styrene and acrylonitrile.

28 Claims, No Drawings

PROCESS FOR PREPARING RUBBER REINFORCED STYRENIC RESINS

TECHNICAL FIELD

The present invention relates to a new process for preparing rubber reinforced styrenic resins, more particularly ABSA Resins which are composites of styrene-acrylonitrile copolymers and rubbery acrylates polymers crosslinked by a diolefinic compound.

BACKGROUND OF THE INVENTION

It is well known that styrenic homopolymers and copolymers of styrenic compounds and acrylonitrile have poor impact strength. In order to improve this impact strength, rubber is added to these resins where it acts as a reinforcing agent. A widely used method comprises polymerizing a styrenic compound and an unsaturated nitrile in the presence of an unsaturated rubber. The obtained products are more stable and have superior properties when compared with similar products prepared by other methods, such as blending or milling.

One usual technique for preparing rubber reinforced styrenic resins by grafting chains of homo- or copolymers of a styrenic compound onto a rubber consists of carrying out the polymerization either by an all emulsion process or an all suspension process or a mass-suspension process. Such techniques present an economic problem, as the manufacture of these reinforced styrenic resins depends on rubber supplies.

In order to decrease the costs of the resins and to obviate some drawbacks of the prior processes, it has been proposed to prepare rubber reinforced styrenic resins by forming the rubber particles in situ in the presence of a rigid styrenic resin. The process comprises contacting a polystyrenic matrix and a monomer or a mixture of monomers forming a rubbery polymer or copolymer by polymerization and then suspension polymerizing said monomer(s) with formation of a rubber partly grafted to the matrix. The production of rubber reinforced synthetic resins by this method is a batch-process. Moreover, the beads of the final resin must be washed, centrifuged and dried.

There exists a need in the art, therefore, for a less expensive method for producing rubber reinforced synthetic resins.

SUMMARY OF THE INVENTION

It is therefore an object of the present invention to provide a new process for polymerization of a monomer mixture of acrylates and diolefinic compound in the presence of a copolymeric matrix of styrene and acrylonitrile.

It is another object of the present invention to provide an improved process for preparing rubber reinforced resins wherein the rubber particles are formed in situ by mass polymerization in the presence of a polystyrenic matrix.

A further object of this invention is to provide a continuous process for mass polymerization of monomers which produce a rubbery copolymer in situ, in the presence of a polystyrenic matrix.

In order to accomplish the foregoing objects according to the present invention, there is provided a continuous process for preparing rubber reinforced styrenic resins of the ABSA-type which are composites of styrenic compound-acrylonitrile copolymers and rubbery polymers of acrylate esters crosslinked by a diolefinic compound, said process comprising the steps of:

(a) adding a monomer material selected from the group consisting of alkyl ester of acrylic acid, alkyl ester of methacrylic acid and mixtures thereof together with a part of the diolefinic compound to a first solution of a copolymeric matrix of a styrenic compound and acrylonitrile in an inert solvent, whereby there is formed a second solution of said monomer material, diolefinic compound, and said matrix in the inert solvent, (b) charging continuously the second solution into a first polymerization reactor and subjecting the second solution to mass polymerization conditions to polymerize said part of said monomer material, (c) withdrawing continuously the prepolymer mixture from said first reactor, (d) charging continuously said mixture into a second polymerization reactor and subjecting said mixture to a further mass polymerization in the presence of the rest of the diolefinic compound whereby there is formed in situ a crosslinked rubbery material dispersed into said copolymer matrix, (e) withdrawing continuously the reaction mixture from said second reactor and subjecting it to a heat treatment to remove the solvent and the residual monomers, and (f) recovering the ABSA resin.

DETAILED DESCRIPTION OF THE INVENTION AND ITS PREFERRED EMBODIMENTS

The process of the present invention for preparing rubber reinforced styrenic resins comprises the steps of polymerizing a monomer material comprising an alkyl ester of acrylic or methacrylic acid or a mixture thereof and a diolefinic compound in the presence of a polystyrenic matrix comprising a copolymer of styrenic compound and acrylonitrile, said polymerization being carried out by a continuous mass method. A rubbery copolymer is formed from the monomer material and is partly grafted on the polystyrenic matrix.

The polystyrenic matrix is a copolymer of styrenic compound and acrylonitrile. As used herein, the term "SAN matrix" refers to this polystyrenic matrix. The styrenic compound which is most often used for preparing the SAN matrix is styrene, yet styrene derivatives, such as halogen-, alkyl- and aryl-substituted styrene may be used in admixture with styrene. Specific examples of such styrene derivatives include methylstyrenes, vinyltoluene, p-chlorostyrene, phenylstyrene, vinylnaphthalene, etc. As is known in the art, the amount of the styrene derivative which can be optionally used in admixture with styrene can vary between wide limits. In the following text, such materials are collectively referred to as "styrenic compound." Acrylonitrile is most often used for preparing the SAN matrix, but methacrylonitrile may be used instead of or in admixture with acrylonitrile. These materials are herein collectively referred to as "acrylonitrile."

The amounts of styrenic compound and acrylonitrile within the SAN matrix may vary between wide limits. The amount of styrenic compound is generally at least about 10% by weight, based on the matrix, but can reach up to about 90 wt. % or even more. In a preferred SAN matrix, the weight ratio of styrenic compound to acrylonitrile varies between about 4:1 and 1:1. The SAN matrix may also contain a low amount of another copolymerization monomer, such as acrylic or methacrylic acid ester, vinyl ester, vinyl chloride, etc. This amount does not generally exceed about 8 wt. %, based on the weight of SAN matrix.

The SAN matrix is dissolved in an inert solvent. Said solvent can be any saturated solvent boiling between about 120° C. and about 175° C. at atmospheric pressure and preferably between about 130° C. and about 150° C. The preferred solvents are alkylbenzenes, such as ethylbenzene.

The solution of SAN matrix in the inert solvent may contain from about 10% to about 70 wt % of SAN matrix. Lower concentrations of SAN matrix are not advantageously used, as they would require the removal of large amounts of solvent after the production of the final ABSA resin. On the other hand, the monomers to be polymerized are not easily dispersed in a viscous solution having a content high in SAN matrix. Preferably, the solution will contain from about 20 to about 50 wt. % of SAN matrix.

The monomers which produce a crosslinked rubbery copolymer by polymerization in the presence of the SAN matrix comprise an alkyl ester of acrylic acid and a diolefinic compound.

The term "alkyl ester of acrylic acid" relates to alkyl esters of acrylic acid and/or methacrylic acid. Alkyl esters, wherein the alkyl group is a saturated straight or branched chain containing from about 1 to about 14 carbon atoms, are preferably used. Specific examples of such alkyl radicals are ethyl-, n-and isopropyl, n-butyl, sec-butyl, isobutyl, hexyl, heptyl, 2-octyl, 2-ethylhexyl, nonyl, decyl, dodecyl and tetradecyl. The selection of the alkyl radical and the respective amounts of esters of acrylic acid and methacrylic acid are such that the resulting polymer or copolymer exhibits rubbery properties, that is, e.g. a glass-transition temperature ($T_G$) lower than about 0° C.

The diolefinic compound which is added to crosslink the rubbery copolymer is selected from the group comprising the conjugated diolefinic hydrocarbons such as butadiene, isoprene, 2,3-dimethyl-1,4-butadiene, chloroprene and the like. For economic reasons, butadiene preferably will be used for producing the ABSA resins of the present invention.

The rubbery material resulting from the polymerization of the acrylates is efficiently crosslinked when the amount of this diolefinic compound is at least about 20 wt. %, based on the total amount of acrylates and diolefinic compound. However, it has been found that the rubbery material is not homogeneous when amounts of butadiene higher than about 40 wt. % are present during the polymerization of the acrylates. Generally, the amount of diolefinic compound ranges between about 25 and about 35 wt. %, based on the total amount of rubbery material and diolefinic compound.

According to the process of the present invention, the acrylate esters are first added to the solution of SAN matrix and are then prepolymerized in the presence of a part of the diolefinic compound. The rest of the diolefinic compound is added and the mixture is further polymerized to completion. The amount of diolefinic compound during the prepolymerization step generally comprises between about 20 and about 50% and more particularly between about 25 and 40% of the total amount of diolefinic compound used.

The acrylate esters and a part of the diolefinic compound are first added to the solution of SAN matrix in a vessel provided with a stirrer. The amount of acrylate esters may vary between about 15 and about 50 wt-percent, based on the total weight of copolymeric matrix and acrylate esters. The residence time and the temperature must be sufficient to assure a dissolution or at least a homogeneous dispersion of acrylates and diolefinic compound into the matrix solution, but must not exceed values at which polymerization of the acrylate esters could occur. A prematurate and unwanted polymerization of these monomers would result in the formation of gels. The temperature in this vessel generally ranges between about 70° C. and about 130° C. and more particularly between about 80° and about 120° C. The residence time depends on this temperature and on other factors, such as the type of acrylate esters and the concentration of the solution of SAN matrix; it can be easily selected by the worker skilled in the art.

The solution obtained or second solution is continuously introduced into a first polymerization reactor for mass pre-polymerization of the acrylate esters in the presence of a part of the diolefinic compound. The solution may also contain other components such as stabilizers, molecular weight regulators and internal lubricants, such as mineral oils.

According to one embodiment of the invention, the mass pre-polymerization can be a thermal polymerization. The temperature in this pre-polymerization zone is maintained at a value varying between about 130° C. and about 170° C., which is sufficiently high to convert a part of the acrylate ester monomers.

According to another embodiment of this invention, the mass pre-polymerization is performed in the presence of any free radical generating catalyst system preferably a peroxide, a perester or a perazo-compound, such as di-tert-butylperoxide, lauroyl peroxide, cumyl peroxide or hydroperoxide, azo-bis-isobutyronitrile or mixtures thereof. The amount of such catalysts may vary between about 0.02 and about 2.5 wt. %, and preferably between about 0.05 and about 1.5 wt. %, based on the total weight of monomers and copolymer. This polymerization is carried out at a temperature ranging between about 100° and about 140° C.

In each of these embodiments, the choice of the temperature depends mainly on the type of monomer material and on the composition of the solution introduced into the polymerization zone. Moreover, the polymerization conditions are selected in order to polymerize from about 30 to about 95% of the acrylate esters and more particularly from about 50 to about 80%.

The mixture containing the solvent, the SAN matrix, the prepolymer and acrylate monomers is continuously withdrawn from the first reactor and is sent to a second polymerization reactor, after addition of the rest of the diolefinic compound. This latter compound may be introduced into the second reactor, together with the above mixture. A preferred embodiment comprises continuously introducing at least a part of this diolefinic compound into the line linking both the reactors. The amount of diolefinic compound which can be mixed in the said line with the mixture withdrawn from the prepolymerizer depends mainly on the composition of said mixture or, in other words, depends on the dispersion rate of the diolefinic compound in the mixture. Generally, this first part of the rest of diolefinic compound will vary between about 20 and about 40% of this rest. By this method, the diolefinic compound introduced in this line is dispersed in the mixture before polymerization. The remaining part of the diolefinic compound is then continuously added to the second reactor.

Complete polymerization of the acrylate esters and cross-linking of the rubber by the diolefinic compound is carried out in the second reactor.

According to a preferred embodiment of the present invention, the polymerization is carried out with the use of a mixture of two catalysts. One free radical generating catalyst has a short half-life, while the second catalyst has a longer half-life. By way of example, the catalyst system may comprise a mixture of a perester (such as tertbutyl perbenzoate or tert-butyl peracetate), and a peroxide (such as tert-butyl peroxide, dicumylperoxide or cumylhydroperoxide). In the first reactor, polymerization is started at a temperature of about 100° to about 120° C. under the action of the perester catalyst. Complete conversion of the monomers is then carried out in the second reactor, at a temperature of about 120° to about 140° C., under the action of the peroxide catalyst.

One suitable way to perform the polymerization comprises using a first tank reactor provided with a stirrer and with means for close control of the temperature. The prepolymer withdrawn from this first reactor is further polymerized in a staged isobaric stirred reactor in the presence of the rest of diolefinic compound. Such reactor is a cylindrical, elongated horizontal vessel provided with a longitudinal shaft and with baffles for partition into stages, each stage having an agitator associated with the shaft. Each baffle is provided with a top aperture for passage of evaporated vapor which is removed, condensed and recycled by example to the first reactor. Each baffle is also provided with a bottom aperture for passage of the polymerizing mixture. Control means are adapted to regulate pressure, temperature and flow of said mixture in each stage. The prepolymer is thereby further polymerized by a progressive multistage polymerization, under a substantially linear flow and under isobaric conditions.

During this polymerization step, the monomer material is polymerized with formation in situ of a rubbery material and the diolefinic compound leads to a good crosslinking of this rubbery material.

The ABSA resin is continuously withdrawn from the second reactor and is treated to remove the solvent and the residual monomers. This treatment may be carried out by using known means. According to one embodiment of the invention, the mixture withdrawn from the second reactor is first subjected to a heat treatment in order to remove the unreacted diolefinic compound as quickly as possible, and is then subjected to a second treatment, for instance in a devolatilizer or on a film-type evaporator to remove the solvent and the rest of residual monomers. The ABSA resin is thereafter extruded, generally in the presence of antioxidant and optionally in the presence of a conventional plasticizing agent.

By utilizing the aforementioned process and more particularly by controlling the progressive introduction of the diolefinic compound, it has been found that the final ABSA resin is practically free from by-products, such as dimers of this diolefinic compound and addition products formed from this compound and the acrylate esters.

In the final ABSA resin, the acrylate rubber formed in situ is highly dispersed in the continuous SAN phase and the final resin is practically gel-free. In the prior processes for producing rubber reinforced styrenic resins, styrene or a mixture of styrenic and acrylonitrile was polymerized in the presence of a rubber. This latter is particularly effective when it is present during the polymerization of the monomers (styrene or styrene and acrylonitrile). Grafting of some monomer to rubber takes place and occlusion of polystyrene or styrene-acrylonitrile copolymer extends the volume fraction of the dispersed, reinforcing rubber phase. This rubber contains double bonds which provide grafting sites and a high percentage of styrenic polymer chains are chemically grafted onto the rubbery polymer chains.

On the contrary, with the process of the present invention a copolymer matrix is first produced and thereafter the monomer material is added to the matrix and then polymerized to form a rubbery polymer. This latter is only partly grafted onto the matrix. However, it has been unexpectedly found that the resulting ABSA resin has enhanced properties.

This result is believed to be achieved because the monomer material is uniformly dispersed in the copolymer matrix; polymerization of this monomer material is confined to the matrix, without production of separate particles of rubbery polymer, thus without gel formation; and the acrylate rubber formed in situ has been carefully crosslinked by the diolefinic compound without substantial formation of by-products.

The final ABSA resin is characterized by the high degree of homogeneity of the crosslinked rubber particles throughout the copolymer matrix.

We claim:

1. A process for the continuous production of rubber reinforced styrenic resins of the ABSA-type which are composites of styrenic compound-acrylonitrile copolymers and rubbery polymers of acrylate esters crosslinked by a diolefinic compound, said process comprising the steps of:
   (a) adding a monomer material selected from the group consisting of alkyl ester of acrylic acid, alkyl ester of methacrylic acid and mixtures thereof together with a part of the diolefinic compound to a first solution of a copolymeric matrix of a styrenic compound and acrylonitrile in an inert solvent, whereby there is formed a second solution of said monomer material and said matrix in the inert solvent,
   (b) charging continuously said second solution into a first polymerization reactor and subjecting said second solution to mass polymerization conditions to polymerize a part of said monomer material,
   (c) withdrawing continuously a prepolymer mixture from said first reactor,
   (d) charging continuously said mixture into a second polymerization reactor and subjecting said mixture to a further mass polymerization in the presence of the rest of the diolefinic compound whereby there is formed in situ a crosslinked rubbery material that is dispersed into said copolymer matrix,
   (e) withdrawing continuously a reaction mixture from said second reactor and subjecting said mixture to a heat treatment to remove the solvent and the residual monomers, and
   (f) recovering the ABSA resin.

2. The process as defined in claim 1, wherein the copolymeric matrix comprises from about 10–90 wt. % of a styrenic compound and from about 90–10 wt. % of acrylonitrile.

3. The process as defined in claim 2, wherein the weight ratio of styrenic compound to acrylonitrile ranges between 4:1 and 1:1.

4. The process as defined in claim 2, wherein the copolymeric matrix comprises a low amount of a rubbery polymer used in an amount not exceeding about 8% by weight.

5. The process as defined in claim 1, wherein the solution of copolymeric matrix in the inert solvent comprises from about 10 to about 70 wt. % of copolymeric matrix.

6. The process as defined in claim 5, wherein the solution contains from about 20 to about 50 wt. % of copolymeric matrix.

7. The process as defined in claim 1, wherein the inert solvent is a saturated solvent having a boiling point ranging between about 130° and about 175° C.

8. The process as defined in claim 7, wherein the saturated solvent has a boiling point ranging between about 130° and about 150° C.

9. The process as defined in claim 7, wherein the saturated solvent is an alkylbenzene.

10. The process as defined in claim 9, wherein the solvent is ethylbenzene.

11. The process as defined in claim 1, wherein the alkyl radical of the alkyl ester contains from 1 to about 14 carbon atoms.

12. The process as defined in claim 1, wherein the monomer material produces by polymerization a rubbery material having a glass-transition temperature lower than about 0° C.

13. The process as defined in claim 1, wherein the amount of diolefinic compound ranges between about 20 and about 40%, based on the total weight of monomer material and diolefinic compound.

14. The process as defined in claim 13, wherein the amount of diolefinic compound ranges between about 25 and about 35%, based on the total weight of monomer material and diolefinic compound.

15. The process as defined in claim 13, wherein the diolefinic compound is a conjugated diolefinic hydrocarbon.

16. The process as defined in claim 15, wherein the diolefinic compound is butadiene.

17. The process as defined in claim 1 wherein the monomer material is used in an amount ranging between about 15 and about 50%, based on the total amount of monomer material and copolymeric matrix.

18. The process as defined in claim 1, wherein the monomer material is added to a first solution of a copolymeric matrix in an inert solvent and the mixture is heated to a temperature ranging between about 70° C. and about 130° C. under non-polymerizing conditions whereby there is formed a second solution of said monomer material and said copolymeric matrix in the inert solvent.

19. The process as defined in claim 18, wherein said mixture is heated to a temperature ranging between about 80° and about 120° C.

20. The process as defined in claim 18, wherein the second solution is introduced together with an amount of diolefinic compound ranging from about 20% to about 50% by weight of the total amount of diolefinic compound, into a first polymerization reactor for mass pre-polymerization.

21. The process as defined in claim 20, wherein the second solution is introduced into said first reactor together with an amount of diolefinic compound ranging from about 25% to about 40% by weight of the total amount of diolefinic compound.

22. The process as defined in claim 20, wherein the mass pre-polymerization is a thermal mass pre-polymerization and is carried out at a temperature ranging between about 130° and about 170° C.

23. The process as defined in claim 20, wherein the mass pre-polymerization is carried out in the presence of a free radical generating catalyst system at a temperature ranging between about 100° and about 140° C.

24. The process as defined in claim 23, wherein the catalyst system is used in an amount ranging between about 0.02 and about 2.5 wt. %, based on the total amount of monomers and copolymeric matrix.

25. The process as defined in claim 24, wherein the catalyst system is used in an amount ranging between about 0.05 and about 1.5 wt. %, based on the total amount of monomers and copolymeric matrix.

26. The process as defined in claim 20, wherein from about 30 to about 95% of the monomer material is polymerized in said first reactor.

27. The process as defined in claim 26, wherein from about 50 to about 80% of the monomer material is polymerized in said first reactor.

28. The process as defined in claim 1, wherein step (d) is carried out in a staged isobaric stirred reactor.

* * * * *